Nov. 19, 1935.  E. RAMSTACK  2,021,379
AUTOMATIC AIR CONTROL FOR COMBUSTION ENGINES
Filed Sept. 26, 1934
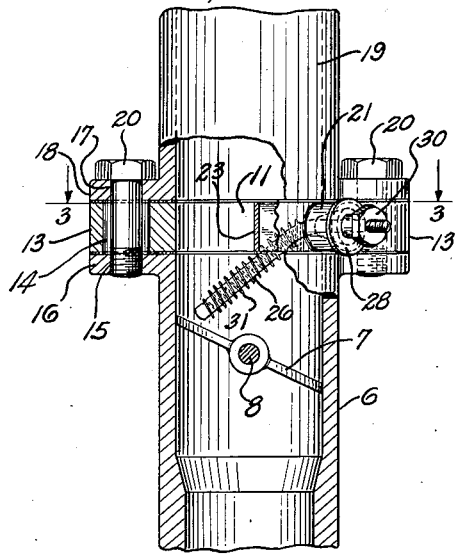
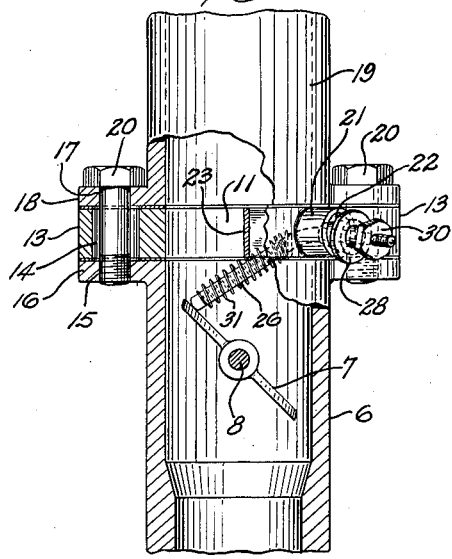
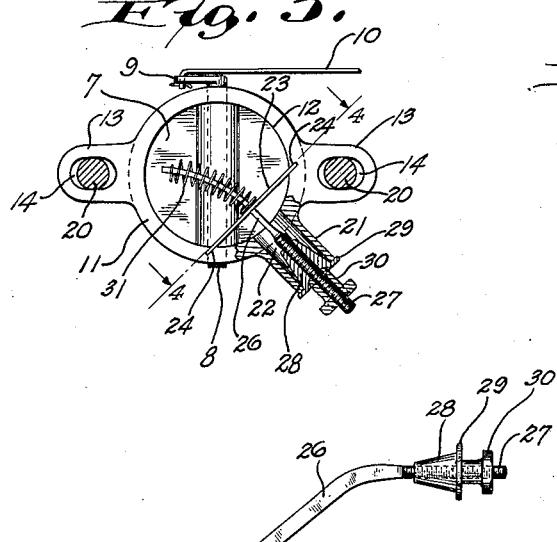
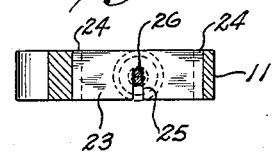
INVENTOR.
Erich Ramstack
BY
Morsell Lieber & Morsell
ATTORNEYS.

Patented Nov. 19, 1935

2,021,379

UNITED STATES PATENT OFFICE 2,021,379

AUTOMATIC AIR CONTROL FOR COMBUSTION ENGINES

Erich Ramstack, Milwaukee, Wis., assignor of one-half to Walter Winkler, Milwaukee, Wis.

Application September 26, 1934, Serial No. 745,522

9 Claims. (Cl. 123—119)

This invention relates to improvements in automatic air controls for combustion engines.

The present invention has for its principal object the provision of means for admitting additional air to the mixture of gasolene and air passing from the carburetor into the intake manifold. While it has heretofore been proposed to modify the explosive mixture in this manner, the devices heretofore offered have either required special conduit construction between the carburetor and engine, or complicated lever hook-ups with the throttle control rod.

It is a principal object of the present invention to provide a compact device for accomplishing the above purpose which can be sold as an accessory and readily be installed by an unskilled person.

A further object of the invention is to provide an air control which is automatically operable to control the admission of additional air in accordance with the speed of the engine.

A further object of the invention is to provide an air control device which is adapted to increase the efficiency of the engine and effect a substantial saving in gasolene consumption.

Other objects of the invention are to provide an automatic air control which is adjustable in a simple manner to provide for the admission of additional air beginning at any desired speed above idling, which is very inexpensive to manufacture, which has few working parts, and which is positive in operation.

A more specific object of the invention is to provide an automatic air control for the purpose described consisting of a small-sized unit readily positionable between the attaching flanges of the carburetor outlet and the intake manifold and held in position by the same bolts which hold said two flanges together.

With the above and other objects in view, the invention consists of the improved automatic air control for combustion engines and all its parts and combinations as set forth in the claims and all equivalents thereof.

In the accompanying drawing, in which the same reference numerals designate the same parts in all of the views:

Fig. 1 is a fragmentary, elevational view of the carburetor outlet and a portion of the intake manifold of an internal combustion engine, showing the device cooperating therewith, parts being broken away and shown in section;

Fig. 2 is a similar view, showing the butterfly valve of the carburetor moved to a position of engagement with the valve rod of the improved device to open the latter;

Fig. 3 is a sectional view taken on line 3—3 of Fig. 1;

Fig. 4 is a sectional view taken on line 4—4 of Fig. 3; and

Fig. 5 is a detail view of the air valve and actuating rod therefor.

Referring more particularly to the drawing, the numeral 6 designates a conduit leading from the carburetor of a standard combustion engine such as is used on present-day automobiles. The numeral 7 designates a butterfly valve of standard construction such as is positioned in said outlet conduit of standard carburetors. The said butterfly valve is rigidly mounted on a rod 8 in the usual manner, and said rod may project thru the conduit and have an arm 9 rigidly mounted on one end thereof, which arm is operable by a throttle rod 10 in the usual manner. The rod 10 may extend to the usual position for control from the driver's seat. The construction just described is of standard type and well known in the art.

The improved unit consists of a cast metallic frame 11 having an opening 12 of substantially the same diameter as the interior of the outlet conduit 6 of the carburetor and having oppositely disposed lugs 13 provided with apertures 14 for cooperation with apertures 15 in lugs 16 on the upper end of the conduit 6 and for cooperation with apertures 17 formed in lugs 18 on the lower end of the intake manifold conduit 19. The usual bolts 20 may be employed to hold the unit in position.

As shown in Fig. 3, the unit is formed with a lateral extension 21 having a duct 22 passing therethru and communicating with the open interior of the frame.

A bridge member or guiding strip 23 has its end positioned in slots 24 as shown in Figs. 3 and 4, and said bridge is provided with a substantially central slot 25.

A valve rod 26 has its inner end portion rectangular in cross-section and has its outer end portion threaded, as at 27. A conical valve member 28 having a flanged outer end portion 29 is threaded on the threaded end of the valve rod and is adapted to be locked in a desired position by a lock nut 30. Said valve rod assembly shown in Fig. 5 cooperates with the frame in the manner shown in Fig. 3, its flattened, inner end portion being slidable thru the slot 25 of the bridge 23. A coil spring 31 has one end secured to the inner end of the valve rod and has its other end engageable with the bridge member 23.

It may thus be seen that the unit comprises merely the frame, which may be cast, the valve rod assembly, and the bridge member. It may also be seen that the bridge member is readily inserted into position during manufacture in the slots 24, and the metal of the upper ends of said slots may be squeezed over the bridge member after it is in place to hold the latter in position. The bridge member may, of course, be secured in other ways; but the slotted arrangement provides a simple and accurate manner of assembly.

In addition to the structural simplicity of the unit, an important feature of the invention resides in the fact that the unit can be quickly placed in position between the outlet of the carburetor and the lower end of the intake manifold by any unskilled person, making the device very practical for sale as an accessory. It is to be noted that no modification of any of the parts or conduits of the engine are required. If the butterfly valve 7 of the engine happens to operate in a reverse manner from that shown in the drawing, it is merely necessary to reverse the position of the air control unit in installation.

In use, the lock nut 30 is first loosened to permit adjustment of the valve member 28. This adjustment is effected by merely turning the valve member on the threaded portion of the valve rod. It is preferable to so adjust the valve that when the butterfly 7 of the carburetor is closed as shown in Fig. 1, the inner end of the valve rod will be just out of engagement with said butterfly. Thus, the butterfly valve can be opened slightly to permit idling of the engine without causing admission of additional air. After an adjustment is once made, the lock nut is tightened to hold the valve in the desired position. Any other adjustments made necessary due to change in type of gasolene being used or due to seasonal requirements can, of course, be quickly made in the same manner. The actual operation of the device is entirely automatic. The butterfly valve 7 of the carburetor is, of course, controlled thru the throttle rod 10 in the usual manner, and when the engine is accelerated, the butterfly valve will be opened as shown in Fig. 2, causing pressure to be exerted on the inner end of the rod 46, causing said rod to be moved against the tension of the coil spring 31 to open the valve and permit entrance of air thru the duct 22 in the extension 21. This additional air will be drawn in by the suction from the engine and will therefore modify the mixture from the carburetor. Due to the conical shape of the valve member 28, the greater the length of travel of the valve rod 26 when engaged by the butterfly valve, the greater the amount of air admitted. Therefore, as the acceleration and speed of the engine are increased, the amount of additional air admitted is automatically increased at a proportional rate.

With the automatic control of the air, the mixture to the engine is regulated in the best manner to meet the requirements of the engine; and therefore substantial economy in gas consumption is effected. In addition, the device increases the efficiency and smoothness of operation.

Altho only one form of the invention has been shown and described, it is obvious that various modifications may be made therein without departing from the spirit of the invention; and all of such changes and modifications are contemplated as may come within the scope of the claims.

What I claim is:

1. An air controlling device for use with a combustion engine having a carburetor provided with a valve controlled outlet duct and having an intake manifold conduit connectible with said duct at a point spaced forwardly from the valve in the outlet duct, comprising a unit readily insertable between said outlet duct and intake manifold conduit, an air supply valve formed in said unit, a movable valve rod having one end in connection with said valve and having its other end extending into the outlet duct of the carburetor and operable by engagement of said outlet duct valve therewith, said other end of the valve rod being so positioned as to be substantially perpendicular to the plane of the outlet duct valve during the entire operating movement of said valve, and means normally urging said valve rod to said valve closing position.

2. An air controlling device for use with a combustion engine having a carburetor provided with a valve controlled outlet duct and having an intake manifold conduit connectible with said duct at a point spaced forwardly from the valve in the outlet duct, comprising a unit readily insertable between said outlet duct and intake manifold conduit, an air supply valve formed in said unit, a movable valve rod having one end in connection with said valve and having its other end bent into the outlet duct of the carburetor and operable by engagement of said outlet duct valve therewith, said other end of the valve rod being so positioned as to be substantially perpendicular to the plane of the outlet duct valve during the entire operating movement of said valve, and means normally urging said valve rod to said valve closing position.

3. An air controlling device for use with a combustion engine having a carburetor provided with a valve controlled outlet duct and having an intake manifold conduit connectible with said duct at a point spaced forwardly from the valve in the outlet duct, comprising a unit readily insertable between said outlet duct and intake manifold conduit, an air supply valve formed in said unit, a movable valve rod having one end in connection with said valve and having its other end extending into the outlet duct of the carburetor and operable by engagement of said outlet duct valve therewith, said other end of the valve rod being so positioned as to be substantially perpendicular to the plane of the outlet duct valve during the entire operating movement of said valve, means normally urging said valve rod to said valve closing position, and means for varying the position of the inner end of the valve rod with respect to the outlet duct valve to provide for a first engagement with said inner end beginning at any desired engine speed.

4. An air controlling device for use with a combustion engine having a carburetor provided with a valve controlled outlet duct and having an intake manifold conduit connectible with said duct at a point spaced forwardly from the valve in the outlet duct, comprising a unit readily insertable between said outlet duct and intake manifold conduit, said unit having an air opening communicating with the exterior, a valve rod having its outer end movable in said air opening and having its inner end extending into the outlet duct of the carburetor and operable by engagement of said outlet duct valve therewith said inner end of the valve rod being so positioned as to be substantially perpendicular to the plane of the outlet duct valve during the entire operating movement of said valve, and a valve member on the outer end of said rod cooperating with said air opening to control the admission of air.

5. An air controlling device for use with a combustion engine having a carburetor provided with a valve controlled outlet duct and having an intake manifold conduit connectible with said duct, comprising a unit readily insertable between said outlet duct and intake manifold conduit, said unit having an air opening communicating with the exterior, a valve rod having its outer end movable in said air opening and having its inner end extending into the outlet duct of the carburetor and operable by engagement of said outlet duct valve therewith, and a valve member adjustably mounted on the outer end of said rod and cooperating with said air opening to control the admission of air.

6. An air controlling device for use with a combustion engine having a carburetor provided with a valve controlled outlet duct and having an intake manifold conduit connectible with said duct at a point spaced forwardly from the valve in the outlet duct, comprising a unit readily insertable between said outlet duct and intake manifold conduit, said unit having an air opening communicating with the exterior, a valve rod having its outer end movable in said air opening and having its inner end extending into the outlet duct of the carburetor and operable by engagement of said outlet duct valve therewith, a valve member on the outer end of said rod cooperating with said air opening to control the admission of air, and guiding means for said valve rod, said inner end of the valve rod and said guiding means being so positioned with respect to one another and with respect to the outlet duct valve that said inner end of the valve rod is substantially perpendicular to the plane of the outlet duct valve during the entire operating movement of said valve.

7. An air controlling device for use with a combustion engine having a carburetor provided with a valve controlled outlet duct and having an intake manifold conduit connectible with said duct, comprising a unit readily insertable between said outlet duct and intake manifold conduit, said unit having an air opening communicating with the exterior, a valve rod having its outer end movable in said air opening and having its inner end extending into the outlet duct of the carburetor and operable by engagement of said outlet duct valve therewith, a valve member on the outer end of said rod cooperating with said air opening to control the admission of air, guiding means for said valve rod, and yielding means having one end secured to the inner end of said valve rod and having its other end engageable with said guiding means.

8. An air controlling device for use with a combustion engine having a carburetor provided with a valve controlled outlet duct and having an intake manifold conduit connectible with said duct at a point spaced forwardly from the valve in the outlet duct, comprising a unit readily insertable between said outlet duct and intake manifold conduit, said unit having an air opening communicating with the exterior, a valve rod having its outer end movable in said air opening and having its inner end extending into the outlet duct of the carburetor and operable by engagement of said outlet duct valve therewith, a valve member on the outer end of said rod cooperating with said air opening to control the admission of air, and a guiding bridge member in connection with said unit having a slot thru which said valve rod is slidable, said inner end of the valve rod and said slot in the guiding bridge being so positioned with respect to one another and with respect to the outlet duct valve that said inner end of the valve rod is substantially perpendicular to the plane of the outlet duct valve during the entire operating movement of said valve.

9. An air controlling device for use with a combustion engine having a carburetor provided with a valve controlled outlet duct and having an intake manifold conduit connectible with said duct, comprising a unit readily insertable between said outlet duct and intake manifold conduit, said unit having an air opening communicating with the exterior, a valve rod having its outer end movable in said air opening and having its inner end extending into the outlet duct of the carburetor and operable by engagement of said outlet duct valve therewith, a valve member on the outer end of said rod cooperating with said air opening to control the admission of air, and a guiding bridge member in connection with said unit having a slot thru which said valve rod is slidable, said slot and valve rod being shaped to prevent turning movement of the valve rod.

ERICH RAMSTACK.